United States Patent [19]

Betton

[11] 4,209,709
[45] Jun. 24, 1980

[54] ANTI-THEFT IGNITION SYSTEM

[75] Inventor: Arnold L. Betton, Reseda, Calif.

[73] Assignee: BBJ Laboratories, Newport Beach, Calif.

[21] Appl. No.: 939,784

[22] Filed: Sep. 5, 1978

[51] Int. Cl.² .......................................... B60R 25/00
[52] U.S. Cl. .............................. 307/10 AT; 180/287; 361/172; 340/64
[58] Field of Search ................. 307/10 AT, 10 R; 361/171, 172; 340/63, 64; 180/114; 200/43, 44, 45

[56] References Cited

U.S. PATENT DOCUMENTS

| 1,396,667 | 11/1921 | Simms . | |
| 1,451,209 | 4/1923 | Elmore . | |
| 1,506,350 | 8/1924 | Kukjra . | |
| 1,828,562 | 10/1931 | Gilpin . | |
| 1,974,489 | 9/1934 | Geraghty . | |
| 2,251,735 | 8/1941 | Goleby . | |
| 2,295,178 | 9/1942 | Kolias . | |
| 2,295,214 | 9/1942 | Jackson . | |
| 2,439,155 | 4/1948 | Wilkes . | |
| 2,491,595 | 12/1949 | Williams | 200/43 |
| 2,583,752 | 1/1952 | Smith . | |
| 2,620,387 | 12/1952 | Eberhardt . | |
| 2,819,770 | 1/1958 | Gibbs . | |
| 2,964,733 | 12/1960 | Rajo | 340/63 |
| 3,058,092 | 10/1962 | Johnson | 340/64 |
| 3,242,388 | 3/1966 | Tellerman . | |
| 3,419,729 | 12/1968 | Hall | 307/10 AT |
| 3,430,058 | 2/1969 | Yoshida | 307/10 AT |
| 3,515,340 | 6/1970 | Mika | 235/61.7 |
| 3,515,891 | 6/1970 | Margenson et al. | 307/10 AT |
| 3,524,989 | 8/1970 | Pecott | 307/10 AT |
| 3,541,505 | 11/1970 | Lee | 340/64 |
| 3,543,040 | 11/1970 | Nemeth | 307/10 AT |
| 3,553,641 | 1/1971 | Moragne | 340/64 |
| 3,576,536 | 4/1968 | Wolfe | 340/147 |
| 3,596,243 | 7/1971 | Leibholz | 340/64 |
| 3,611,287 | 10/1971 | Hoff | 340/63 |
| 3,619,633 | 11/1971 | Brandon | 307/10 AT |
| 3,631,301 | 12/1971 | Goldman | 340/63 |
| 3,634,697 | 1/1972 | MacFarlane | 307/10 AT |
| 3,634,724 | 1/1972 | Vest | 180/114 X |
| 3,660,831 | 5/1972 | Nicola et al. | 340/274 |
| 3,675,035 | 7/1972 | Brasty | 307/10 AT |
| 3,675,036 | 7/1972 | Davies | 307/10 AT |
| 3,691,306 | 9/1972 | Hinrichs | 307/40 |
| 3,697,945 | 10/1972 | Comber | 340/64 |
| 3,710,316 | 1/1973 | Kromer | 340/63 |
| 3,738,444 | 6/1973 | Roby | 180/114 |
| 3,740,713 | 6/1973 | Teich | 340/64 |
| 3,754,148 | 8/1973 | Nye | 307/10 AT |
| 3,754,164 | 8/1973 | Zorzy . | |
| 3,755,777 | 8/1973 | Lee | 340/64 |
| 3,764,859 | 10/1973 | Wood et al. | 307/10 AT |
| 3,772,574 | 11/1973 | Hughes | 30/ |
| 3,781,804 | 12/1973 | Lederer, Jr. | 307/10 AT |
| 3,790,933 | 2/1974 | Cort | 340/63 |
| 3,796,889 | 3/1974 | Fradkin et al. | 307/10 AT |
| 3,800,279 | 7/1972 | Thompson | 340/65 |
| 3,818,436 | 6/1974 | Hong | 340/64 |
| 3,829,829 | 8/1974 | Teich | 340/64 |
| 3,831,065 | 8/1974 | Martin et al. | 361/172 |
| 3,834,484 | 9/1974 | Sangster | 180/114 |
| 3,921,130 | 11/1975 | O'Donnell et al. | 340/64 |
| 3,938,079 | 2/1976 | Croisier | 340/64 |
| 3,942,605 | 3/1976 | Burnside | 180/114 |
| 3,956,732 | 5/1976 | Teich | 340/64 |
| 3,961,310 | 6/1976 | Grant | 340/65 |
| 3,967,166 | 6/1976 | Wei | 307/10 AT |
| 3,973,641 | 8/1976 | Barker | 180/114 |
| 4,064,547 | 12/1977 | Zagwyn | 361/172 |
| 4,090,089 | 5/1978 | Morello et al. | 307/40 |
| 4,093,870 | 6/1978 | Epstein | 307/10 R |

Primary Examiner—L. T. Hix
Assistant Examiner—James L. Dwyer
Attorney, Agent, or Firm—John G. Mesaros

[57] ABSTRACT

An anti-theft ignition system including a generally tamper-proof canister or housing substantially covering the solenoid of the starter motor with a portion thereof covering the ignition switch terminal of the solenoid. The housing includes a compartment for receiving electronic circuitry including an encoded circuit coupled to or forming a part of a microcomputer operable in response to proper sequential actuation of the ignition key for energizing a silicon controlled rectifier in series relation with the ignition switch.

44 Claims, 7 Drawing Figures

ANTI-THEFT IGNITION SYSTEM

BACKGROUND OF THE INVENTION

The background of the invention will be discussed in two parts:

1. Field of the Invention

This invention relates to anti-theft ignition systems for automobiles and the like.

2. Description of the Prior Art

Joyriding in automobiles has been a constant source of concern with law enforcement officers as well as the owners of the vehicles. Such joyriding, and even theft of automobiles, has resulted in substantial economic loss to the owners of the vehicles as well as to property of others where collisions have resulted due to the joyride or theft.

Although anti-theft devices and systems have been devised, skilled or even semi-skilled amateur or professional car thieves or joyriders have been adapt at "hot-wiring" an automobile for the purpose of removal of the vehicle.

In the conventional automobile, the two devices which normally require electrical energization are (1) the starter solenoid and (2) the distributor. Electrical energy to the winding of the starter solenoid actuates the plunger thereof to close the circuit from the battery to the starter motor while simultaneously the solenoid plunger actuates a shift lever to force a pinion gear into meshing engagement with the flywheel to thereby mechanically rotate the engine, and initiate ignition. Electrical energy to the distributor, in turn, actuates the firing sequence of the spark plugs to thereby enable the engine to continue running. With the engine thus hot-wired, the vehicle can be readily moved.

Attempts have been made to secure the vehicle by providing hood locks which are accessible only from the interior of the automobile, and further efforts have been made to secure the interior of the automobile by redesigning the window opening to protect against the insertion of wire or retracting the door lock. However, an individual intent on removing an automobile generally has no problem gaining access to the interior of the vehicle due to carelessness of the owner in leaving the doors unlocked, or alternatively, by deft manipulation of bent hangers or other tools to gain access to the interior. Once access to the interior of the automobile is obtained, the hood lock lever can be actuated to provide access to the interior of the engine compartment for hot-wiring purposes.

Other attempts have been made to provide armor cabling on certain electrical conductors within the engine compartment to preclude hot-wiring, but such efforts have not been entirely successful.

Electronic security ignition circuits have likewise been devised, such circuits, for example, being shown and described in U.S. Pat. Nos. 3,766,400; 3,784,839; and 3,852,614. In such circuits, additional wiring must be provided to the driver compartment to enable the installation thereof. For example, U.S. Pat. No. 3,784,839 a combination lock circuitry is illustrated wherein the combination lock actuation means is provided by a thumbwheel combination keyboard which operates in conjunction with the normal ignition switch, thereby requiring that the standard ignition switch wiring in the driver's compartment be restructured as well as requiring that additional wiring be utilized for the keyboard thumbwheel combination device. Because of this additional wiring, a thief or a joyrider will readily discern the additional wiring, thereby potentially enabling the individual to disarm or remove such added devices. The ignition wiring on automobiles of more recent vintage passes down through the interior of the steering column, thus making them generally unavailable for ready modification. Furthermore, with the ignition switch mounted on the steering column, and even with the more recent vintage automobiles having steering wheel lock assemblies, the ignition switches and lock assemblies can be disabled and removed very quickly with a pair of pliers.

It is an object of the present invention to provide a new and improved anti-theft ignition system.

It is another object of the present invention to provide a new and improved anti-theft ignition system utilizing a code known only to the operator for starting the engine, the code being transmitted through the existing ignition wiring from the standard ignition key.

It is a further object of the present invention to provide a new and improved anti-theft ignition system including a generally tamper-proof canister substantially surrounding the starter motor solenoid, the canister having a compartment for receiving the electronic circuitry of the system.

SUMMARY OF THE INVENTION

The foregoing and other objects of the invention are accomplished by providing a tamper-proof canister or housing configured for substantially surrounding the starter motor solenoid and substantially enclosing the ignition switch terminal thereof. The housing is provided with an elongated tubular compartment having a portion with a shoulder adjacent the rear end thereof with an aperture extending therethrough for receiving a fastener for securing the housing to the starter motor. A steel ball is inserted through the tubular portion in snug relation therein and adhesively affixed therein by a suitable epoxy with a steel ball adjacent the fastener.

The housing contains an elongated compartment for housing electrical circuitry including a controllable rectifier such as silicon controlled rectifier in series relation with the ignition switch terminal of the solenoid. The circuitry includes an encoded device electrically coupled to a microcomputer responsive only to the correct code for energizing the controllable rectifier. Input to the control circuitry is provided through the conventional ignition switch on the automobile with the code being sequentially applied by repeated manipulation of the ignition key from the ignition to the start position, with one manipulation for each number of each digit of the code and a brief pause between the digits. Completion of the code permits energization of the controllable rectifier and thence the solenoid winding. The system is activated with the engine running by the manipulation of the ignition key switch through the first two digits of the coded number. If the ignition key is turned to the "Off" position prior to activating the system, the ignition key will operate in a conventional manner. Thus, the system may be selectively energized as desired by the user.

Other objects, features and advantages of the invention will become apparent from a reading of the specification when taken in conjunction with the drawings in which like reference numerals refer to like elements in the several views.

DESCRIPTION OF THE PREFERRED EMBODIMENT

Figure 1:
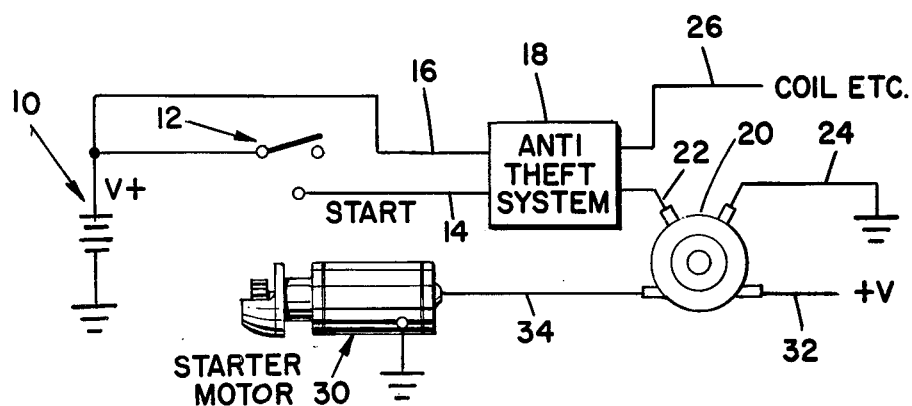
FIG. 1 is a partially schematic, partially diagrammatic illustration of the anti-theft ignition system according to the invention.

Referring now to the drawings and particularly to FIG. 1, there is shown an ignition system of an automobile which has been modified according to the invention. Within the ignition system of an automobile, there is a battery generally designated 10 connected through the conventional ignition key switch generally designated 12, the key operated contact of which is operable to a "start" position over conductor 14. The conductor 16 provides current from battery 10 to anti-theft system 18 completing the circuit over conductor 16. Both of conductors 14 and 16 are electrically connected to an anti-theft system electrical circuitry 18 which controls the winding of the starter solenoid 20 through conductors 22 and 24 in series therewith and with ground. Other conductors such as conductor 26 are interconnected with the other conventional circuitry such as the ignition coil and the like.

As in conventional systems, the solenoid 20 is generally mounted atop the starter motor 30 with solenoid actuation resulting in movement of a shift lever interconnecting the solenoid plunger and a thrust bearing mounted within the starter motor housing, the thrust bearing operating a pinion which in turn meshes with the flywheel for starting the engine of the automobile. The solenoid 20 accomplishes two purposes, one being the energization of a circuit from the battery over lead 32 through the solenoid relay over lead 34 to energize the starter motor 30. The solenoid simultaneously through actuation of the solenoid plunger manipulates the pinion gear mounted for rotation with the starter motor armature into engagement with the flywheel of the vehicle to thereby "start" the engine.

Referring again in FIG. 1, in a conventional ignition system the start conductor 14 is coupled directly to the conductor 22 to energize the coil winding of the solenoid 20 with the conductor 16 being directly coupled to the other electrical circuitry such as the ignition coil and the like for operating the engine. As will hereinafter be discussed, the circuitry 18 according to the invention when disabled permits the automobile engine to run in the conventional manner, that is, rotation of the ignition switch 12 to the start position will energize the solenoid 20 to complete the circuit to the start motor 30 while release of the key under force of the spring normally provided in the conventional ignition will return the movable contact of switch 12 to the "run" position which is not utilized in the current system. Once this occurs, however, the circuitry 18 disconnects the conductor 14 from the conductor 22 of the solenoid 20. This disconnection enables the ignition key 12 to be moved to the "start" position with the engine running without energizing the coil of the solenoid 20. In this manner, as will hereinafter be described, the conventional ignition key can be utilized as a code entry device to the system circuitry 18 for enabling the circuitry 18, and once enabled the key to the ignition switch 12 can be returned to the off position and removed with the system thus being "set". Once the system is set the ignition key is then inserted into the switch 12 and manipulated to the "start" position in proper sequence indicative of the code whereby upon entry of the proper code, the switch 12 may then be manipulated to the "start" position for starting the engine through the circuitry 18.

In conventional ignition systems of automobiles of more recent vintage, the ignition switch 12 is mounted on the side of the steering column with the conductors 14 and 16 running down the interior or the steering column and, thus are not readily available for convenient modification. Furthermore, due to this construction, running additional wires to the ignition switch or modifying the ignition switch with additional wires is prohibited. In accordance with the present invention, the two conductors 14 and 16 need not be modified, nor need the ignition switch 12 be modified in any way to accommodate the system.

Figure 2:
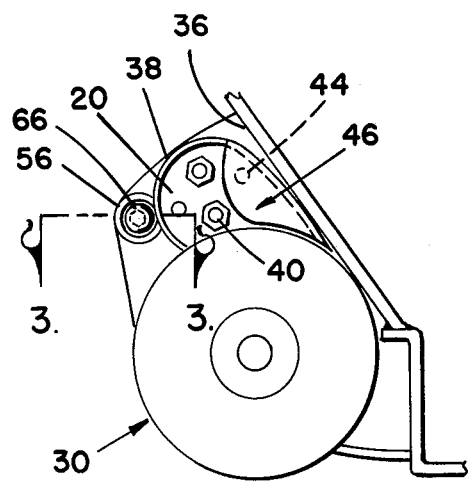
FIG. 2 is a partial front view depicting the housing used in the anti-theft ignition system mounted on the solenoid of the starter motor of a vehicle.

Referring now to FIGS. 2-5, as best illustrated in FIG. 2 the starter motor 30 on a V-8 engine is mounted in close proximity to the bottom thereof so that the pinion thereof is in alignment with the periphery of the flywheel which contains the gear teeth, the flywheel in turn being coupled to the drive shaft for rotating the engine components. The solenoid 20 is mounted on top of the starter motor 30 with a portion of the rear housing of the starter motor 30 being configured for receiving the rear portion of the solenoid 20 which contains the shift lever. The solenoid 20 is suitably fastened to the rear housing of the starter motor 30 by fasteners. As depicted in FIG. 2, the surface of the solenoid 20 facing the front of the engine 36 (only partially shown) has two large terminals 38 and 40, terminal 40 being directly coupled through an opening in the starter motor housing to the interior thereof for energizing the field coil of the starter motor 30. The other terminal 38 is connected by means of a heavy duty electrical strap to the battery 10. Two smaller terminals are generally diametrically opposed, one terminal 42 being shown in solid lines, this terminal corresponding to the one which receives the conductor 24 for connection to ground. The other terminal 44 (shown in dotted line) is the terminal which effectively receives the conductor 22 of FIG. 1, terminal 44 being the "ignition switch" terminal. In accordance with the present invention, a canister or housing generally designated 46 substantially surrounds the solenoid 20 and as better illustrated in FIGS. 4 and 5 the housing 46 has a generally tubular portion 48 with a longitudinally cut-away section 50, the diameter of the interior opening of cylindrical portion 48 being just slightly larger than the outer diameter of the solenoid 20 to enable the housing 46 to be slid over the solenoid 20 in close abutting relation therewith.

Figure 3:
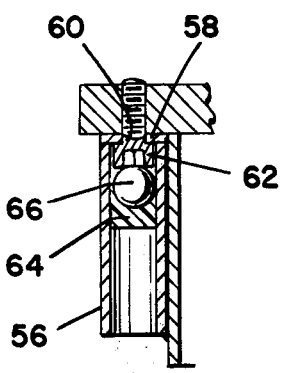
FIG. 3 is a cross-sectional view taken generally along Line 3—3 of FIG. 2.
Figure 4:
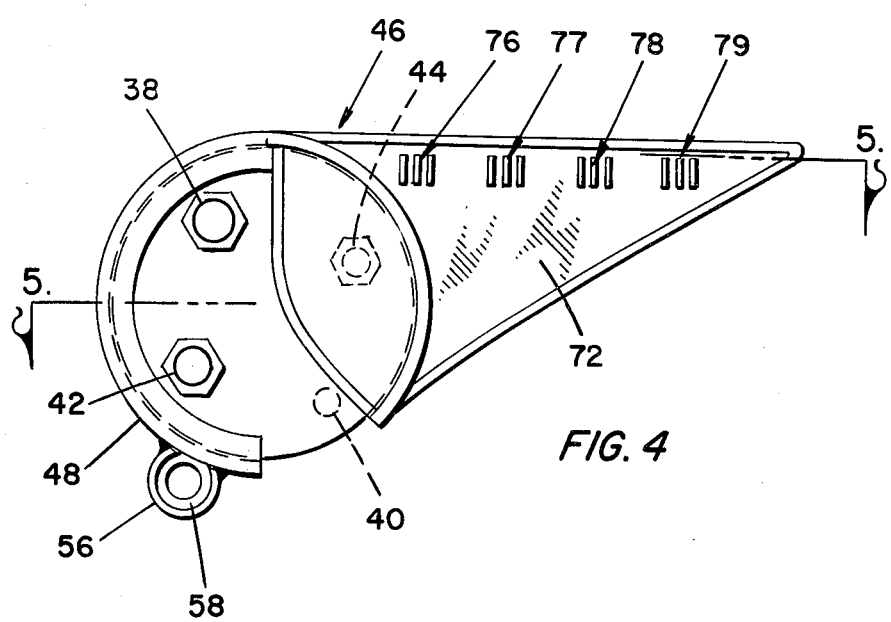
FIG. 4 is a rear end view of the housing shown in assembled relation in FIG. 2.
Figure 5:
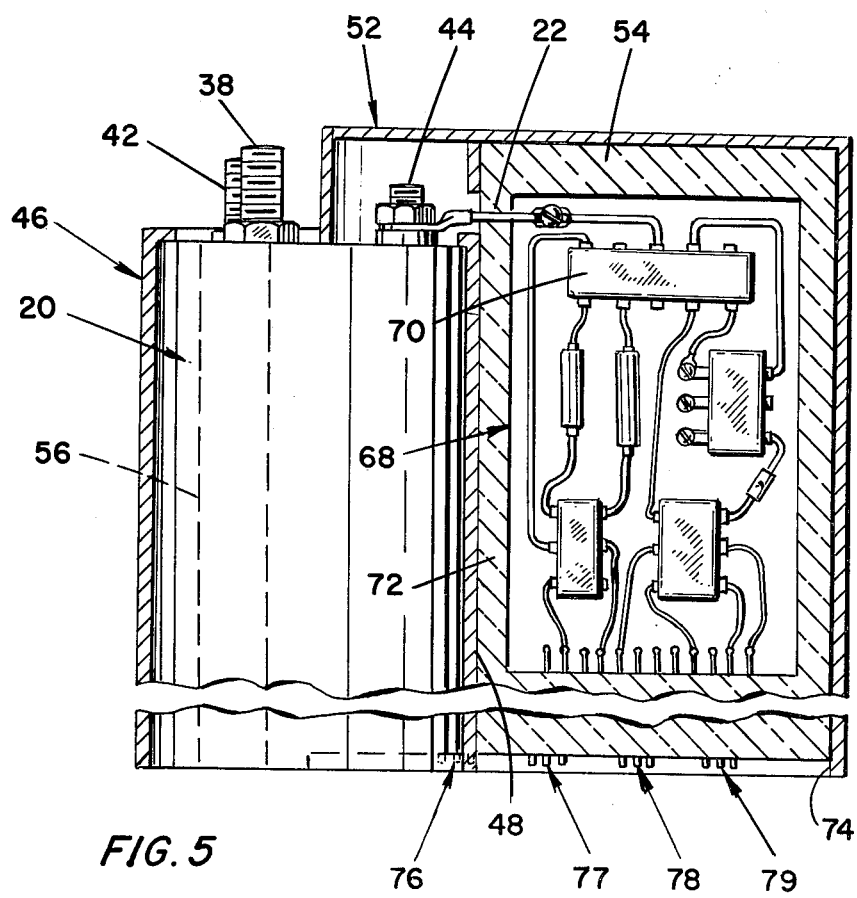
FIG. 5 is a cross-sectional view taken generally along Line 5—5 of FIG. 4 with the solenoid shown in assembled relation therein and part of the encapsulation removed for illustrating the electronic circuitry.

As better illustrated in FIGS. 4 and 5 the housing 46 is configured at the front end thereof to permit the battery terminals 38 and 40 to be exposed along with the grounding terminal 42. However, the housing 46 is formed to provide an enclosed shroud portion 52 which completely encloses the ignition terminal 44 to thereby deny access to an intruder to this particularly important terminal of the starter motor system. Extending outwardly from the cylindrical portion 48 is a compartment 54 which is generally triangular in cross section (see FIG. 4) and contoured to fit within the space between the outer periphery of the starter motor 30 and the adjacent side surface of the engine 36 thereby minimizing accessibility to both the housing 46 and solenoid 20 (see FIG. 2). To prevent ready removal of the canister or housing 46, as shown in FIGS. 2 and 3, the housing 46 is provided with an elongate tubular portion 56 having at the rear end thereof a shoulder portion 58 with an aperture 60 extending therethrough for receiving the shaft of a suitable cap screw 62 or the like. For assembling the housing 46 to the solenoid 20, the conventional fastener 62 utilized to secure the solenoid 20 to the rear portion of the housing of starter motor 30 is removed, the housing 46 is then electrically connected to the ignition terminal 44 and slid over the solenoid 20. An elongated cap screw driver (not shown) is then utilized to place the fastener 62 into the elongate opening of the tubular portion 56 to thereby fasten the housing 46 to the rear portion of the housing of the starter motor 30. To further secure the connection, a steel ball 66 is placed into the tubular portion 56 and an epoxy 64 is inserted therein, the diameter of the steel ball 66 being slightly less than the interior diameter of the tubular portion 56. Upon setting of the epoxy, any attempt to remove the housing 46 would require a large amount of time and would deter all but the most persistent car thieves. In the preferred embodiment, the housing 46 is made from a hardened steel or metal with the steel ball 66 likewise being of a high quality steel composition. For removal of the system and housing 46, the starter motor 30 is removed in its entirety carrying with it the solenoid 20. The starter motor 30 is then placed in a vertical position and a solvent is inserted into the tubular portion 56. After some specified time period, the starter motor 30 can be inverted with the opening of the tubular portion 56 extending downwardly as shown in FIG. 3 thereby permitting the steel ball 66 to drop out to thereby provide access to the fastener 62.

Referring now to FIGS. 4 and 5, the electrical circuitry 18 may conveniently include a printed circuit board generally designated 68 having electrical components 70 mounted therein for connection through conductor 22 to the ignition switch terminal 44. For this purpose, the circuit board 68 is received within the compartment 54 with an opening provided between the compartment 54 and the shroud portion 52 for providing access within the housing suitably encapsulated within the compartment 54 with the metallic structure of the housing 46 effectively acting as a magnetic shield and the encapsulating compound 72 serving to protect the circuitry 70 from the environmental conditions existing at that location on an automobile engine. The circuitry depicted in FIG. 5 is not intended to be an accurate physical layout of the circuitry involved in the circuitry 18 but is merely intended to be illustrative of the mechanical mounting of the circuit board 68 within the compartment 54. The rear portion 74 of the compartment 54 is open and as illustrated in FIGS. 4 and 5, FIG. 4 being a rear view of the assembled unit, there are four groups of electrical conductors exposed through the encapsulating compound 72, these groups being respectively designated by the referenced numerals 76–79. These conductor groups 76–79 are conductors of a diode matrix encoder which are accessible through the surface of the encapsulated compound 72 to provide means for encoding the circuitry 18 to a unique code for each system with the code entry being generally close to the end of the assembly process.

By the utilization of four groups of conductors 76–79, each group can be encoded to one digit of a four digit code and by utilizing three conductors in each grouping, the maximum number of possible combinations is seven to the fourth power or approximately 2,400 different combinations assuming "zero" is not used. By way of example, if the first conductor in group 76 represents 4, the second conductor represents 2, and the third conductor represents 1, by cutting all three conductors (or conversely not cutting any conductors depending on the logic used) the digit 7 becomes the first number of the combination. Similarly, if the second conductor of group 77 is cut this would indicate the digit 2 as the second number of the combination. Likewise, if the second conductor of groups 78 and 79 are severed the entire code will be "7-2-2-2". It is to be understood of course that additional conductors can be utilized in the diode matrix encoder to provide more possible combinations, and furthermore, the combination may include more or fewer digits.

Figure 6:
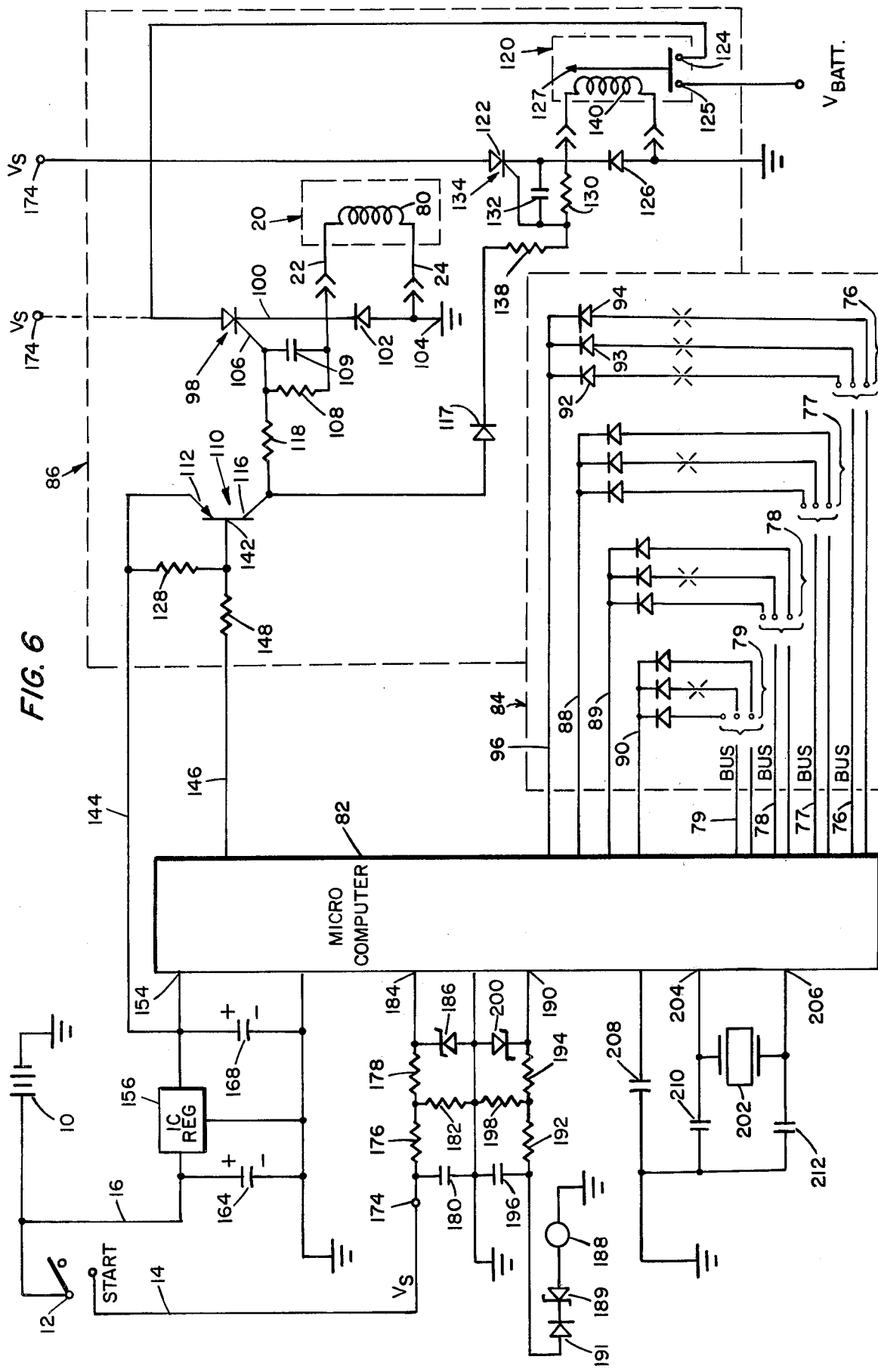
FIG. 6 is a schematic diagram of the electrical circuitry used in the ignition system of FIG. 1.

Referring now to FIG. 6, the details pertaining to the electrical circuitry 18 will be described in detail. The solenoid 20 is shown in dotted lines with the energizing coil 80 shown schematically therein with the ends thereof being indicated as conductors 22 and 24 respectively to correlate the schematic to the diagram of FIG. 1.

The main functional components of the circuitry 18 includes a microcomputer 82, to which is electrically connected the diode matrix encoder array (which is enclosed in a dotted rectangle and given the reference numeral 84) and the controllable switching means (likewise shown within a dotted rectangle and given reference numeral 36). The array 84 may also be contained within the computer 82, with appropriate leads provided for connection to the conductor groups.

Within the array 84, the reference numerals for each group of conductors 76–79 is utilized to correlate the electrical diode connections to the physical layout illustrated in FIGS. 4 and 5, through the groups of conductors are shown in reverse order in FIG. 6. As can be seen, each group of conductors, for example group 76 has the three conductors thereof coupled to the anodes of diodes 92–94 respectively, the cathodes of which are connected together to conductor 96. The conductor group 76 and conductor 96 are electrically connected to the microcomputer 82 for suitable biasing in accordance with the logic selected. Similarly, the conductor groups 77–79 along with cathode leads 88–90 respectively associated therewith are likewise electrically connected to microcomputer 82, the array 84 so formed being a conventional encoder array. By adding additional groups of diodes or by adding an additional diode to each group, the number of possible combinations may be substantially increased.

Certain vehicles employ a wheel well solenoid as a switch for the starter solenoid and in such vehicles, the switching means would include first and second switch circuits, one for each solenoid. The controllable switching means 86 includes a silicon controlled rectifier 98 having a current bearing capacity of approximately 100 amperes with the cathode thereof coupled over lead 100 to conductor 22 with a flyback catch diode 102 having the cathode thereof coupled to the junction of lead 100 and conductor 22, the anode thereof being connected to conductor 24 and to ground 104. The gate electrode 106 of silicon controlled rectifier 98 is coupled through a parallel network of resistor 108 and capacitor 109 to lead 100. A PNP transistor generally designated 110 has the emitter 112 thereof connected to power lead 114. The collector 116 of transistor 110 is connected through a resistor 118 to the gate electrode 106 of rectifier 98. The coil 80 of starter solenoid 20 is connected over leads 22 and 24 in parallel relation with diode 102. For vehicles not employing a second or wheel well solenoid, the anode of silicon controlled rectifier 98 is connected to the start conductor voltage terminal 174 (as illustrated in dotted lines).

In some vehicles a second, or wheel well solenoid 120, is electrically connected into the starting circuit, and when solenoid 120 exists, it is connected into the system of the present invention for operation through a second silicon controlled rectifier 122.

Contact 125 of this solenoid 120 is connected to the battery voltage and the other contact 124 connects to the anode of silicon controlled rectifier 98, thus requiring energizing of solenoid 120 to effect subsequent energization of starter solenoid 20. Rectifier 122 which drives solenoid 120 has its anode connected to the start conductor voltage terminal 174 and its cathode coupled to the cathode of a flyback catch diode 126 which is coupled in parallel with the coil 140 of the wheel well solenoid 120 with the anode of diode 126 connected to ground. A parallel network of resistor 130 and capacitor 132 interconnects the gate electrode 134 and the cathode with gate electrode 134 being coupled to the collector 116 of transistor 110 through resistor 138 and diode 117. The armature 127 of solenoid 120 closes the circuit between contacts 124 and 125 when wheel well solenoid coil 140 is energized.

Inputs are provided to the controllable switching means 86 over "start" lead 146, lead 144 providing bias voltage to transistor 110 by connection to emitter 112 with lead 146 being interconnected through a resistor 148 to the base 142 of transistor 110. Resistor 128 interconnects the base and emitter of transistor 110. The lead 146 has the other end thereof connected to an output terminal of the microcomputer 82 while the lead 144 is coupled to an input 154 to the microcomputer 82 as well as through a current regulator 156 to the conductor 16 which connects to the battery voltage. The current regulator 156 is selected to provide a regulated five volts to the input terminal 154 and to lead 144 for the bias voltage of the components. Smoothing capacitor 164 is coupled between ground and the input terminal of voltage regulator 156 while capacitor 168 is connected to ground from the output thereof.

The inputs from the ignition switch 12 are provided through the start conductor 14 to terminal 174, the pulses being smoothed by a capacitor resistance filter network including series resistors 176 and 178 with a parallel capacitor 180 having the other end thereof connected to ground with another parallel resistor 182 connected between ground and the junction of resistors 176 and 178. The other end of resistor 178 is connected to input terminal 184 of the central processor unit 82 with a zener diode 186 having the cathode thereof connected to the same terminal with the anode coupled to ground.

For determining the "running" condition of the engine, the voltage of alternator 188 is sensed by being coupled to input terminal 190 of the unit 82 through head-to-head coupled diodes (one zener, one regular) 189 and 191 through series resistors 192 and 194 with a smoothing capacitor 196 being coupled between the anode of diode 191 and ground and a filter resistor 198 being connected to ground with the other end thereof connected to the junction of resistors 192 and 194. A zener diode 200 has the cathode thereof coupled to terminal 190 with the anode thereof coupled to ground.

Frequency control is provided by a crystal 202 connected between the crystal terminals 204 and 206 of the microcomputer 82 with suitable capacitors 210 and 212 interconnected between the crystal and ground. Again, depending upon the electronics used, the frequency control may be contained within the computer 82.

Capacitor 208 maintains the microcomputer 82 in a reset mode until all voltage transients have been cleared from the information lines.

In operation, the microcomputer 82 is suitably encoded by the diode matrix encoder array 84, this encoding being sensed over conductor group 76–79 and leads 88–90 and 96, each of which is coupled to the cathodes of the respective diode groups. The microcomputer 82, which is essentially a timed event controller, includes counters as well as a decoder with appropriate time delays for sensing the number of ignition switch 12 actuations with appropriate inbetween pauses for subsequent energization of the controllable means 86 as required by the code.

Figure 7:
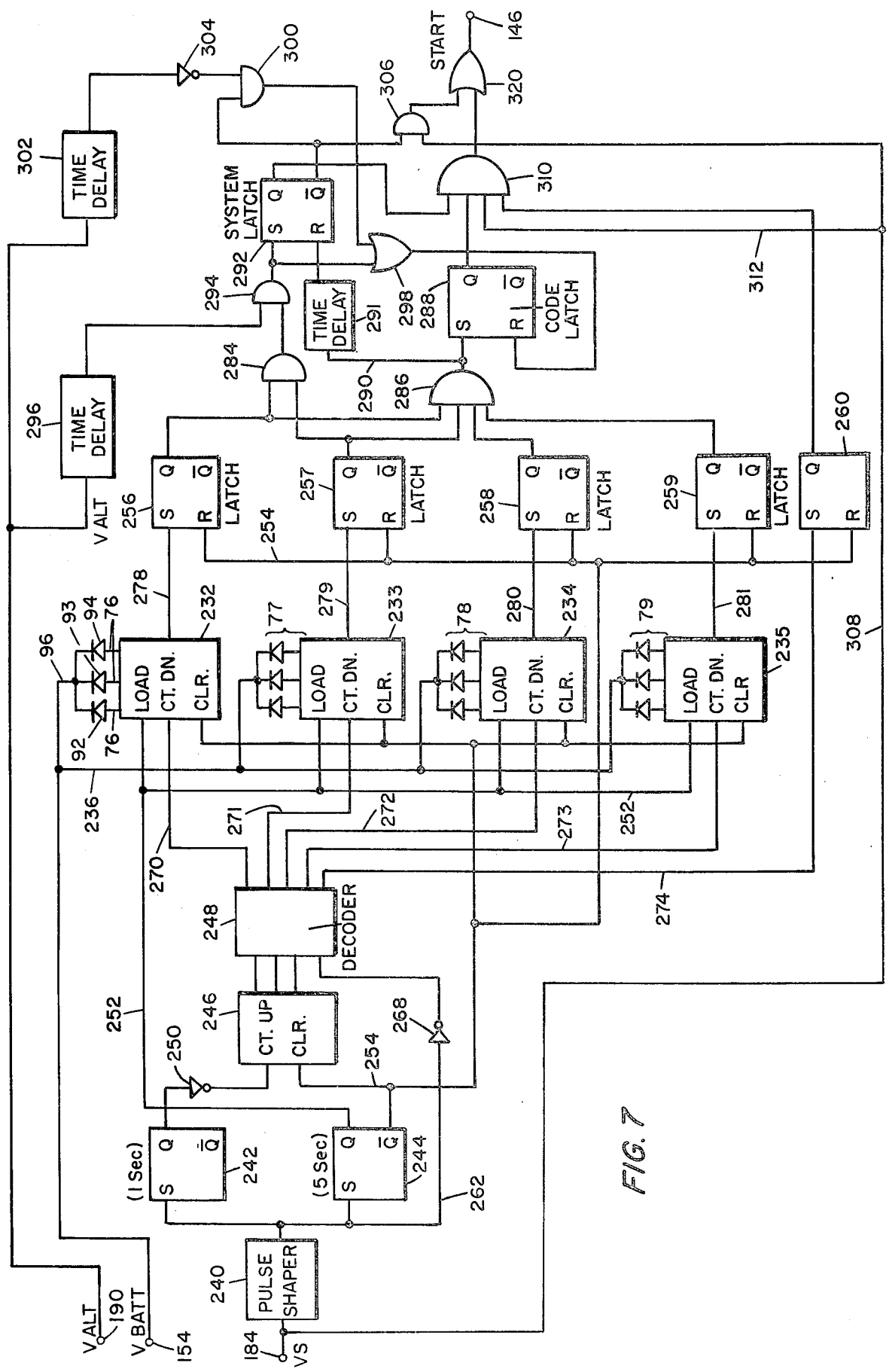
FIG. 7 is a logic diagram of the microcomputer used in the circuit of FIG. 6.

The microcomputer 82 is better illustrated in logic form in FIG. 7 wherein the inputs are illustrated by terminal numbers corresponding to the input terminals of FIG. 6 with the output appearing on lead 146 which is likewise depicted in FIG. 7. The inputs to the microcomputer 82 include regulated voltage input terminal 154, an alternator voltage input terminal 190, and an ignition switch start position input terminal 184, this last mentioned terminal being that over which the pulses are transmitted from the ignition switch 12. For purposes of illustration as well as to simplify description, the diode matrix encoder array is included in FIG. 7 with the conductor groups 76–79 of the array 84 being connected respectively to provide logic inputs to counters 232–235, these four counters being sequentially activated to count down upon the occurrence of certain conditions determined by the proper code and the proper sequence of that code. Although the conductor groups 76–79 are shown in solid lines, it is to be understood that one or more of each conductor of each conductor group may be severed to provide the appropriate encoding. The cathodes of all the diode groups are coupled together over lead 236 to a plus five volt regulated supply which is available from the battery at terminal 154.

Within the microcomputer 82, the ignition switch pulse input terminal 184 is connected through a pulse shaper 240, the output of which is transmitted to first and second retriggerable one-shot multivibrators 242 and 244, multivibrator 242 having appropriate RC network therein or electrically connected thereto to establish a time delay of one second after which the output automatically goes low. The multivibrator 244 provides a five second time delay, the one second time delay corresponding to the time between "words" of the coded signal with the five second time delay being provided to clear or reset the logic for subsequent actuations. For example, in the event the code sequence has not been properly entered, a five second delay is required prior to subsequent attempt to enter the proper code.

In order to sequence the counters 232-235, a logic select system is required, this logic select system being provided by means of a logic select counter 246 having the outputs thereof coupled to a four line to ten line decoder 248. The logic select counter 246 is electrically connected in the "count up" mode with the input thereof received through an inverter 250 from the Q output of multivibrator 242. The Q output of multivibrator 244 is connected over lead 252 to the "load" inputs of the counters 232-235. The "not Q" output multivibrator 244 is coupled over lead 254 to the "clear" input of logic select counter 246 as well as to the clear inputs of counters 232-235, with lead 254 likewise being connected to the "reset" inputs of five latches 256-260, the functions of which will be described hereinafter.

The output of pulse shaper 240 is also provided over lead 262 through inverter 268 to provide one input to the decoder 248, the other three inputs of which are provided from three outputs of logic select counter 246. The outputs of decoder 248 include five conductors 270-274, each of the conductors being connected respectively to the "countdown" inputs of counters 232-235. Each of the counters 232-235 is depicted as having a single output line 278-281 respectively, the output of which goes "high" when the count condition within the respective counter coincides with the encoded count requirement determined by the encoded input of the respective diode group for that counter. The output leads 278-281 are connected to the "set" inputs of latches 256-259 with the "set" input of latch 260 being coupled over lead 274 to receive an output signal from the decoder 248. The latches 256-259 respectively are set in sequence as the outputs of counters 232-235 go high, likewise in sequence, provided the proper code is entered within the time frame of the system time delays. For example, counter 232 with its associated latch 256 would respond to the numeral 7 (that is 7 pulses) in the code example previously given. Latch 257 would correspond to the second numeral or digit of the code with latches 258 and 259 being respectively responsive to the third and fourth digits of the code. The Q outputs of latches 256 and 257 are coupled to the two outputs of AND gate 284 and simultaneously to two of the inputs of a four input AND gate 286, the other two inputs of which are received from the Q outputs of latches 258 and 259. The output of AND gate 286 is coupled to the "set" input of a code latch 288 and simultaneously over lead 290, through a time delay 291 to the reset input of the system latch 292. The output of AND gate 284 is coupled to the first input of an AND gate 294, the other input of which is received from the alternator voltage input terminal 190 through a time delay 296. The output of AND gate 294 is coupled to the set input of system latch 292 and simultaneously to one input of an OR gate 298, the output of which is coupled to the reset input to code latch 288. The other input to OR gate 298 is provided from the output AND gate 300 which has one input thereof coupled to the "not Q" output of system latch 292 with the other input thereof being received from the alternator voltage input terminal 190 through a time delay 302 through an inverter 304.

The "not Q" output of system latch 292 is likewise coupled as a first input to an AND gate 306, the other input of which is coupled over lead 308 to the start pulse voltage input terminal 184.

The Q output of system latch 292 is coupled as a first input to a four input AND gate 310, the second input of which is received from the Q output of code latch 288, the third input being received over line 312 from lead 308 with the fourth input being provided from the Q output of latch 260. The output of AND gate 310 is provided as a first input to OR gate 320, the other input of which is provided from the output of AND gate 306. The output of OR gate 320 is coupled to the start lead 146 which is the output of the microcomputer 82.

Prior to a detailed discussion of operation of the system, and although the description hereinafter will proceed with reference to an ignition system or a vehicle such as an automobile or the like, it is to be understood that the system can be utilized to provide a coded start for a system having an electrically operable component controllable through an electrically operable switch means, wherein operation of the electrically operable component is utilized to provide a condition sensing signal which is required as a condition precedent to "setting" a selectively actuable coding system. In conjunction with the system, series pulses are sequentially entered with a time interval between "words" as a condition for energizing the system. To set the system, the condition sensing signal must be present in conjunction with proper sequential entry of two or more "words".

Referring now to FIGS. 6 and 7, a detailed description of the operation of the system will be provided. Essentially, the description will proceed with reference to four different sets of conditions, these being the first set of conditions in which the system has not been set and a "bypass" mode energizes the starter solenoid 80 as well as the wheel well solenoid 120; a second set of conditions that exist when the engine is running and the system is set or energized; a third set of conditions which exist when the sysem has been set and the operator wishes to start the engine; and the fourth set of conditions which exist when the engine is turned off without setting the system thereby enabling the normal starting of the engine without the requirement for a coded entry.

By reference particularly to FIG. 7, the first set of conditions will now be discussed. If the system latch 292 is not set the "not Q" output of latch 292 is high thereby enabling AND gate 306 which, when a start signal is received over terminal 184, this signal is transmitted over lead 308 to the second input of AND gate 306, the output of which passes through OR gate 320 to provide a "start" signal on lead 146. By reference to FIG. 6, the output appearing on lead 146 drives transistor 110 to a conductive state thereby energizing the gate electrodes of silicon controlled rectifiers 98 and 122 which thereby provide current to the coil 140 of the wheel solenoid 120. When the current is sufficient, the movable contact of solenoid 120 will be actuated to thereby close the circuit between the battery voltage through stationary contacts 124 and 125 through silicon controlled rectifier 98 to thereby energize the starter solenoid 20. This connection is provided to prevent chattering of the wheel well solenoid 120 so that there is no audible sound to enable one to detect the code. In automobile ignition systems having only a starter solenoid, it is to be understood that the second silicon controlled rectifier 122 may be eliminated with the anode of rectifier 98 being connected directly to terminal 174 as indicated in dotted lines.

Once the engine is running, the running condition is sensed by the appearance of an alternator voltage which is thus utilized as a system input or a condition precedent for the second set of conditions. This second set of conditions that exist enable the system to be set, the setting of the system generally being accomplished by the setting of the system latch 292. By reference to FIG. 7 when the alternator voltage is high, this condition is sensed at input terminal 190 which passes through time delay 296 to the first input of AND gate 294 which is thus enabled to provide an output provided AND gate 284 is likewise enabled. To set the system with the engine running, as briefly described previously, the ignition switch 12 is momentarily actuated to the start position 14 (see also FIG. 6) to thereby provide an input pulse to terminal 184, the number of such pulses being determined by the first two digits or words of a code. In the event the first two digits are, by way of the previously given example, 7 and 2 in sequence, the operator actuates the switch 12 to the start position 14 seven times with a one second pause and thence two times resulting in the setting of the system latch 292. This is accomplished in the following manner. With the pulses being received at terminal 184, the pulse shaper 240 suitably preconditions the pulses which are then applied to both multivibrators 242 and 244 as well as over lead 262 through inverter 268 which is one input to the decoder 248. So long as these pulses are being applied to multivibrator 242 with less than one second between pulses, the Q output remains high and thence goes low one second after the last pulse. So long as the Q output is high because of the inverter 250 in series therewith the logic select counter 246 provides no count until the output goes low thereby signaling the end of the first digit or word of the code. With the initial condition of the logic select counter 246 clear the output of decoder 248 enables only lead 270 for transmitting counting pulss to counter 232. Counter 232 is enabled to a load condition by means of a high input appearing on lead 252 from the Q output of multivibrator 244 which remains high so long as the pulses are being applied to the set input thereof within the time delay interval of five seconds provided by multivibrator 244.

These pulses are serially fed into counter 232 by means of the pulses from the pulse shaper 240 passing over lead 262 through inverter 268 through the decoder 248 over lead 270 to thereby countdown within counter 232 until a predetermined condition exists, this condition being a "true" comparison between the number of pulses so applied and the coded input determined by which if any of the conductors of the conductor group 76 are severed to thereby set the logical inputs through the diodes 92, 93, and 94. When this comparison exists, lead 278 goes high thereby setting first word latch 256 to enable one input to AND gate 284. As soon as a one second delay exists after a last pulse, the Q output of multivibrator 242 goes low, this signal being inverted through inverter 250 to thereby enable logic select counter 246 to advance one increment through decoder 248 to thereby enable only output lead 271 while simultaneously disabling output leads 270 and 272-274. The next series of pulses are then applied through input terminal 184 through pulse shaper 240 in the same manner previously discussed for transmission through decoder 248 over lead 271 to the second word counter 233, the output lead 279 of which goes high only if the number of pulses so applied correspond to the input predetermined by the coded entry of conductor group 77. When output lead 279 goes high, the second word latch 257 is thus set thereby providing the second input to AND gate 284 the output of which is provided as an input to the alternator voltage sensing AND gate 294. Thus, with the engine running and the first two words of the code so entered, the system latch 292 is thus set with the Q output thus going high. When system latch 292 is thus set, AND gate 300 is thus disabled since the "not Q" output of latch 292 goes low. Similarly AND gate 306 is likewise disabled since one input is provided from the "not Q" output of latch 292. At this point, the ignition switch 12 of the engine can be turned off and the key removed and the system cannot be energized until the proper code sequence is thereafter entered.

At this point, the third set of conditions exist for starting the engine with the system latch 292 set. With system latch 292 set, the input pulses in correct number and in correct sequence must be applied for all four digits or numerals of the code, these pulses again being applied through pulse shaper 240 and simultaneously through both multivibrators 242 and 244 as well as over lead 262 through invertor 268 to the decoder 248. In the quiescent condition existing just prior to the key being reinserted, all major functional components have been cleared by virtue of the timing out of the five second delay of multivibrator 244, which provides a "clear" output from the "not Q" output thereof, this clear output being provided as an input to the logic select counter 246, to the word counters 232-235 and to the word latches 256-260. Also, when the system latch 292 was set, the output of AND gate 294 was applied through OR gate 298 as a clear or reset pulse to the code latch 288, this latch being effectively set only when word latches 256-259 are set. With the key in the ignition and the pulses applied, so long as the pulse sequence is correct in number with at least a one second but less than five second delay between numerals or words, the decoder 248 sequentially activates output lead 270-273 for providing the properly sequenced pulses into counters 232-235 which sequentially activate output leads 278-281 to set word latches 256-259 respectively. After the last of the four digits, numerals or words are so entered, with a one second time delay, the key of ignition 12 is again actuated to the start lead 14 to provide essentially a fifth word of one pulse to input terminal 184 which enables the decoder 248 to provide a pulse over output lead 274 to set the start or fifth word latch 260. With the first four words properly entered, AND gate 286 is enabled to set the code latch 288 while simultaneously resetting system latch 292 over lead 290 after a suitable time delay 291. During this time interval, system latch 292 is still set thus enabling one input to AND gate 310, the second input of which is received from the code latch 288. With the third input being provided from the start latch 260 when the fifth word or start pulse is provided, actuation of the key to the start position for the time required to start the engine keeps lead 308 high thus providing the fourth input over lead 312 to enable AND gate 310, the output of which is transmitted through OR gate 320 to provide a start signal on lead 146 and thereby energize solenoids 20 and 120 as previously described.

With the engine thus started, if the user so desires, the fourth set of conditions exists, this being that the user may turn off the ignition without setting the system. After the time delay provided by time delay 291 elapses, the system latch 292 is reset thus retaining the system to the conventional operating condition. With system latch 292 thus reset, and the ignition switch 12 turned to the off position, without setting the system, the five second delay of multivibrator 244 thus clears the counters and latches with the code latch 288 being reset upon occurrence of one of two conditions, these conditions being the set pulse to the system latch 292 or the occurrence of the system latch 292 being reset and a low signal appearing at the alternator voltage input terminal 190, the existence of the low condition being sensed through time delay 302 which low signal is inverted by inverter 304 to enable AND gate 300 to thus reset code latch 288. At this point, as previously described in conjunction with the first set of conditions, the ignition system is thus in a state to operate as a conventional ignition system with the start pulse being applied directly over lead 308 through the enabled AND gate 306 through the OR gate 320 to provide a start signal on lead 146.

As previously described, the microcomputer 82 is a timed event controller for serially entered data transmitted through the conventional ignition system of an automobile with time delays provided in accordance with normal user capabilities. Furthermore, in the event a code has been entered erroneously, a five second delay is provided during which the system is cleared so that proper entry can again be attempted. Furthermore, with the electronic components contained within the housing or canister 46 which additionally provides a shield for the start terminal 44 of the solenoid 20, the system is essentially tamper proof due to the inaccessible location of the starter motor on most vehicles. In addition, the utilization of the steel ball 66 within the tubular portion 56 of the canister 46 provides a mechanical integrity to further deter attempts at defeating the system. Although the system requires that a current exist at all times to the microcomputer 82 from the battery 10 to input terminal 154, with judicious selection of components, the current requirement approximates five milliamps in the standby condition for the system. This is in contrast to the electric clocks currently popular in automobiles which require a current drain of about thirty milliamps on a continual basis.

With automobiles having automatic transmissions, such ignition systems have interlocks to prevent starting of the engine in any gear selector position other than neutral or park and it is to be understood that the vehicle interlock would likewise impose the said condition on the instant system.

It is further to be emphasized, that in the logic diagram of FIG. 7, buffers and the like have not been illustrated and furthermore, although the circuitry is depicted in discrete logic form it may be readily programmed onto commercially available chips or microcomputers for providing all the required functions for the system. While there has been shown and described a preferred embodiment, it is to be understood that various other adaptations and modifications may be made within the spirit and scope of the invention.

What is claimed is:

1. In a system for a vehicle having a switch means which is key operable from a first position to a second position for energizing the electrical system of the motor means of said vehicle, the combination comprising:

means for detecting momentary actuations of said switch means for generating serial pulses;
means operable in response to the last pulse of a number of sequentially entered pulses for indicating completion of a word;
means for providing a vehicle condition-sensing signal;
means for providing a plurality of words indicative of a given code;
means for enabling an electrical component of the vehicle for permitting the starting of the motor means; and
means responsive to said signal and to proper sequential entry of at least a portion of said plurality of words for setting said system for permitting subsequent energizing said enabling means only in response to proper sequential entry of all of said words for operating said motor means.

2. The combination according to claim 1 wherein said detecting means includes means for counting the pulses for each of said words.

3. The combination according to claim 2 wherein each of said counting means is selectively encoded to one of said words.

4. The combination according to claim 3 wherein each of said counting means enables latch means only when said counting means receives pulses equal in number to the encoded word of said counting means.

5. The combination according to claim 4 wherein said motor means is an internal combustion engine having voltage generating means and said means for providing a condition sensing signal includes means coupled to said voltage generating means.

6. The combination according to claim 5 wherein said means for detecting said pulses includes means for selectively transmitting said pulses to each of said counters in response to said means operable in response to the last pulse.

7. The combination according to claim 6 wherein said enabling means includes controllable switching means serially connected to the solenoid winding of the solenoid of said internal combustion engine.

8. The combination according to claim 7 wherein said controllable switching means includes a silicon controlled rectifier.

9. The combination according to claim 8 wherein said system further includes a housing configured for encircling said solenoid and for substantially surrounding the ignition terminal thereof.

10. The combination according to claim 9 wherein said housing further includes a compartment for receiving the electronic components of said system.

11. The combination according to claim 10 wherein said housing includes a tubular member configured for passage therethrough of a fastener for coupling the housing to the starter motor housing and a steel ball adhesively received within said tubular portion adjacent the fastener.

12. In an ignition system for a vehicle having a starter solenoid actuable through a terminal thereof connected for electrical conduction through an ignition switch operable from a first position to a second position for completing the circuit to said solenoid terminal, the combination comprising:

a housing member configured for mating engagement with the solenoid housing and for substantially surrounding the switch terminal, said housing including a compartment; and electronic means within said compartment electrically coupled to said terminal and to the second position contact of said ignition switch for completing the circuit between said contact and said switch terminal only in response to a predetermined number of momentary actuations of said ignition switch to said contact in predetermined time relation indicative of a predetermined preset code within said electronic means.

13. The combination according to claim 12 wherein said electronic means includes controllable switching means in series circuit relation with said terminal.

14. The combination according to claim 13 wherein said electronic means includes an encoder.

15. The combination according to claim 14 wherein said encoder is a diode matrix array, and each diode of the array has a conductor in series circuit relation therewith.

16. The combination according to claim 15 wherein said compartment is generally closed with an open end positioned for placement adjacent the rear of the solenoid, said electronic means are substantially encapsulated within said compartment, and said conductors of said diodes are exposed at the surface of the encapsulation compound for enabling selective severance of said conductors for establishing the predetermined code.

17. In a system, the combination comprising:
an electrically operable component;
key-operated switch means operable from a first to a second position;
means coupled to said system for providing a condition sensing signal;
means for receiving a series of pulses generated by momentary actuation of said switch means from said first to said second position;
means for providing a predetermined code having a plurality of words of information;
means for detecting the timing of the pulses entered by said switch means for enabling said receiving means to distinguish between words;
means coupled to said electrically operable component and operable only in response to entry of all of said words in proper sequence for energizing said electrically operable component; and
means responsive to said condition sensing signal and to said receiving means receiving a predetermined number of said words for setting said means coupled to said electrically operable component.

18. The combination according to claim 17 wherein said means coupled to said electrically operable component includes electronic switch means.

19. The combination according to claim 18 wherein said electronic switch means is a silicon controlled rectifier.

20. The combination according to claim 17 wherein said system is included in a vehicle ignition system and said electrically operable component is an electrically operable component of said ignition system.

21. The combination according to claim 20 wherein said electrically operable component is the solenoid winding of the solenoid of the vehicle.

22. The combination according to claim 21 wherein said key operated switch means is the ignition switch of the vehicle.

23. The combination according to claim 22 wherein said means coupled to said system includes means coupled to the motor means of said vehicle for sensing the running condition of said motor means.

24. The combination according to claim 23 wherein said means for receiving a series of pulses includes counting means and said means for providing a predetermined code includes diode means in circuit relation with said counting means.

25. The combination according to claim 24 wherein said means responsive to said condition sensing signal and to said receiving means includes latch means.

26. The combination according to claim 25 wherein said counting means include one counter for each of said words and each of said counters is coupled to latch means operative only in response to the predetermined word for said counter.

27. The combination according to claim 26 wherein said system includes four words of information and said predetermined number of said words are two words.

28. In an ignition system for a vehicle having motor means, the combination comprising:
an electrically operable component coupled for enabling starting of said motor means;
key-operated switch means operable from a first to a second position;
a generally tamper-proof housing member configured for generally surrounding said component and for substantially surrounding an electrical terminal thereof, said housing including a compartment;
electronic means within said compartment electrically coupled to said component terminal and to said switch means for completing the circuit between said component and a voltage source only in response to a predetermined number of momentary actuations of said switch means from said first to said second positions in predetermined relation indicative of a predetermined preset code within said electronic means.

29. The combination according to claim 28 wherein said key operated switch means is the ignition switch of the vehicle.

30. The combination according to claim 29 wherein said electrically operable component is the solenoid of the vehicle and said electronic means are coupled in circuit relation to the solenoid winding thereof.

31. The combination according to claim 30 wherein said electronic means includes electronic switch means in series circuit relation with said solenoid winding.

32. The combination according to claim 31 wherein said housing member is formed from a hard metallic substance.

33. The combination according to claim 32 wherein said housing member include an elongate tubular member secured thereto and having an aperture at one end thereof for receiving a fastener for mounting said housing member to the starter motor housing.

34. The combination according to claim 33 wherein said housing member further includes a steel ball positionable within said tubular member adjacent the fastener and an adhesive secures said steel ball within said tubular member.

35. In an ignition system for a vehicle having motor means rotated by a starter motor having a solenoid electromechanically coupled thereto, the solenoid coil being actuable through a terminal thereof connected for operation through the battery of the vehicle in response to movement of an ignition means operable from a first position to a second position, the combination comprising:

a housing member configured for generally surrounding the solenoid housing and for substantially surrounding the switch terminal thereof;

means on said housing member for securing said housing member to a part of said motor means;

a compartment within said housing member;

electronic means within said compartment electrically coupled to said terminal and to said switch means for circuit completion in said second position, said electronic means including:

code means operable only in response to a predetermined number of series of pulses in predetermined time relation, each series of pulses being indicative of a predetermined word;

means coupled to said switch means for detecting the number and time relation of momentary actuations of said switch means from said first position to said second position;

means coupling said detecting means to said code means;

means coupled in circuit relation with said component for selectively completing the circuit thereto; and means operable in response to actuation of at least two of said code means for rendering said means in circuit relation with said component operable only in response to actuation of all of said code means.

36. The combination according to claim 35 wherein said means on said housing member includes a tubular member having a shoulder portion adjacent one end thereof with an aperture extending therethrough for receiving a fastener.

37. The combination according to claim 26 wherein said means on said housing member further includes a steel ball positionable within said tubular member adjacent said fastener and is adhesively secured thereto.

38. The combination according to claim 35 wherein said code means include counting means and diode means coupled to said counting means for presetting in said counting means predetermined numbers indicative of predetermined words.

39. The combination according to claim 38 wherein said diode means include conductors connected in series relation therewith, said electronic means are encapsulated within said compartment, and said conductor means are accessible at one surface of the encapsulation.

40. The combination according to claim 39 wherein the predetermined words are set into said code means by selective severance of said conductor means.

41. In a key-operated system having a key actuable from a first position for momentary actuation, with a switch contact at a second position for normally energizing a system, the combination comprising:

means for providing a digital code having a plurality of words;

means for receiving a series of pulses from momentary actuation of said key to said second position;

means responsive to the last of the so-entered pulse of said series of pulses for enabling said receiving means to distinguish between words;

means for providing a condition sensing signal;

means responsive to said signal and to said receiving means receiving a predetermined code for setting other means operable only in response to entry of all of said words in proper sequence for subsequent energization of said system.

42. The combination according to claim 41 wherein said means responsive to the last of the so-entered pulse includes time delay means.

43. The combination according to claim 42 wherein said means for providing a condition sensing signal includes means coupled to said system for providing a signal only with said system energized.

44. The combination according to claim 43 wherein said means for providing a digital code provides four words of code, and said predetermined code includes the first two words of said code.

* * * * *